United States Patent
Cho et al.

(10) Patent No.: US 6,210,750 B1
(45) Date of Patent: Apr. 3, 2001

(54) WATER-REPELLENT GLASS AND PROCESS FOR PREPARING SAME

(75) Inventors: Yun-Ju Cho, Seoul; Byung-Sun Hong, Kyungki-do; Joo-Hun Han, Seoul, all of (KR)

(73) Assignee: Samsung Corning Co., Ltd. (KR)

( * ) Notice: Subject to any disclaimer, the term of this patent is extended or adjusted under 35 U.S.C. 154(b) by 0 days.

(21) Appl. No.: 09/224,667

(22) Filed: Dec. 31, 1998

Related U.S. Application Data

(63) Continuation-in-part of application No. 09/009,940, filed on Jan. 21, 1998.

(30) Foreign Application Priority Data

Jun. 26, 1997 (KR) .................................................. 97-27532
Sep. 11, 1998 (KR) .................................................. 98-37636

(51) Int. Cl.[7] ...................................................... B32B 5/16
(52) U.S. Cl. ...................... 427/190; 427/204; 427/301; 427/419.2; 428/331; 428/428; 428/429
(58) Field of Search ..................... 428/403, 441, 428/331, 428, 429; 427/189, 190, 202, 203, 204, 301, 419.2

(56) References Cited

U.S. PATENT DOCUMENTS

| | | | |
|---|---|---|---|
| 5,523,161 | * 6/1996 | Goodwin | 428/421 |
| 5,651,921 | * 7/1997 | Kaijou | 252/309 |
| 5,674,625 | * 10/1997 | Takahashi et al. | 428/428 |
| 5,707,740 | * 1/1998 | Goodwin | 428/410 |
| 5,814,397 | * 9/1998 | Cagliostro et al. | 428/216 |
| 5,856,016 | * 1/1999 | Takahashi et al. | 428/428 |

* cited by examiner

Primary Examiner—H. Thi Le
(74) Attorney, Agent, or Firm—Anderson Kill & Olick, PC

(57) ABSTRACT

A water-repellent glass comprising a uniform and optically transparent silica film with excellent durability and hardness is prepared by a process which comprises: (a) preparing a colloidal silica suspension by hydrolyzing and polycondensing an alkoxysilane in an organic solvent under a basic condition in the presence of water, and then treating the colloidal silica suspension under an acidic condition, to obtain a silica dispersion containing cross-linked spherical silica particles and linear polysiloxane, (b) combining the silica dispersion with a mixed solvent composed of acetic acid and an alcohol to obtain a coating composition, (c) applying the coating composition on the surface of a glass substrate to form a silica layer therefrom, (d) heat treating the silica layer to provide a silica film on the glass substrate, and (e) applying a water-repellent agent on the silica film to provide the water-repellent glass.

10 Claims, 4 Drawing Sheets

WATER-REPELLENT GLASS AND PROCESS FOR PREPARING SAME

CROSS REFERENCE TO RELATED APPLICATION

This application is a continuation-in-part application of copending U.S. Ser. No. 09/009,940 filed on Jan. 21, 1998.

FIELD OF THE INVENTION

The present invention relates to a process for the preparation of a water-repellent glass having excellent durability and hardness; and to a water-repellent glass prepared by said process.

BACKGROUND OF THE INVENTION

Water-repellent glass used in such applications as vehicular and architectural window glasses are generally prepared by coating a water-repellent agent having a low surface energy on the surface of a glass substrate to impart a water-repellent property to the substrate, thereby improving the vision through the windows.

However, a single coating of a water-repellent agent on the surface of a glass substrate is not desirable since an alkaline components of glass migrates to the surface thereof and weakens the bonding between the glass surface and the water-repellent agent, deteriorating the water repellency in course of time. Accordingly, it is required to block such effect caused by the alkaline component for an extended lifetime of a water-repellent glass.

To solve the above problem and also to impart improved durability to a water-repellent coating layer, there have been suggested methods of forming on a glass substrate a silica film preferably having a rough surface. Such film provides an increased surface area which serves to bring a water-repellent agent into better contact with the surface thereof.

For example, Japanese Laid-open Patent Publication No. 213633/1993 and 267684/1995 disclose the use of a coating solution containing at least two silicon polymers having different average molecular weights to form a silica film having microscopically rough surface. However, this method has disadvantages in that the preparation of a coating solution containing two different silicon polymers is not easy, and the coated layer must be heat-treated at a high temperature of 400° C. or higher in order to achieve desired surface roughness. Accordingly, it is difficult to apply this method to vehicular safety glasses such as laminated or tempered glass plates.

Japanese Laid-open Patent Publication No. 132433/1997 suggests a method of preparing a coating solution by mixing two separate silicon polymers obtained from two alkoxysilanes having different alkyl groups. However, this method still requires a high temperature heat treatment step for achieving a suitable surface roughness on the silica film.

SUMMARY OF THE INVENTION

It is, therefore, an objective of the present invention to provide a simple process for preparing a water-repellent glass comprising a silica film having good uniformity, optical transparency, durability and hardness, which does not require a high temperature heat treatment step.

In accordance with an aspect of the present invention, there is provided a process for the preparation of a water-repellent glass which comprises:

(a) preparing a colloidal silica suspension by hydrolyzing and polycondensing an alkoxysilane in an organic solvent under a basic condition in the presence of water, and then treating the colloidal silica suspension under an acidic condition, to obtain a silica dispersion containing cross-linked spherical silica particles and linear polysiloxane, (b) combining the silica dispersion with a mixed solvent composed of acetic acid and an alcohol to obtain a coating composition, (c) applying the coating composition on the surface of a glass substrate to form a silica layer therefrom, (d) heat treating the silica layer to provide a silica film on the glass substrate, and (e) applying a water-repellent agent on the silica film to provide the water-repellent glass.

BRIEF DESCRIPTION OF DRAWINGS

The above and other objects and features of the present invention will become apparent from the following description, taken in conjunction with the accompanying drawings, wherein.

DETAILED DESCRIPTION OF THE INVENTION

Figure 1:
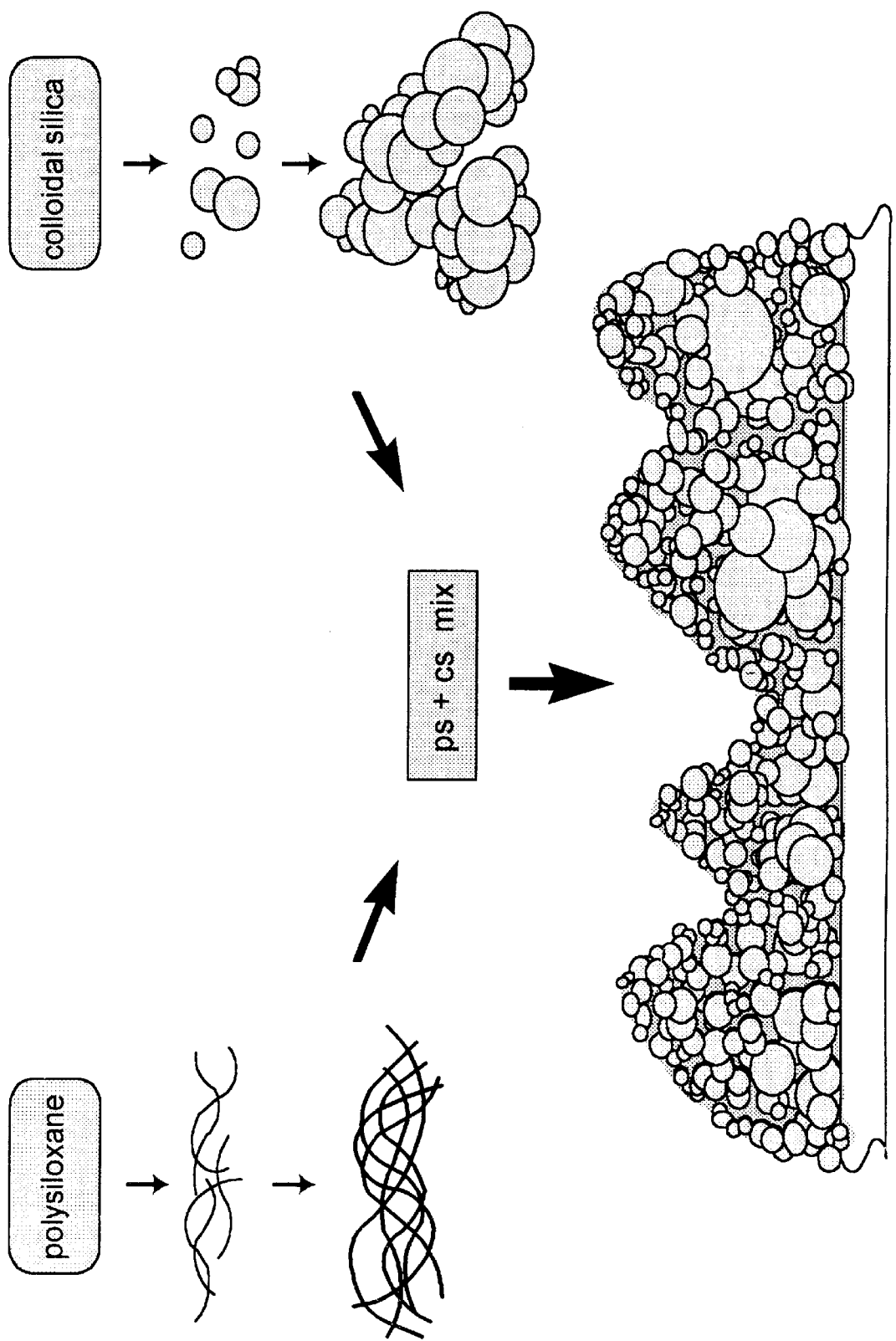
FIG. 1 shows a schematic view illustrating the formation of a rough surface according to the inventive process using a silica dispersion containing both spherical colloidal silica particles and linear polysiloxane.

The inventive process for the preparation of a water-repellent glass is characterized in that a silica dispersion is prepared from an alkoxysilane compound by a two-step polycondensation process (i.e., a first hydrolysis and polycondensation step under a basic condition, followed by a second polycondensation step under an acidic condition); and the silica dispersion is combined with an organic solvent, preferably a mixture of acetic acid and an alcohol, to obtain a coating composition to be applied on a substrate to form thereon a silica film having enhanced surface roughness and durability.

A) Preparation of a Silica Dispersion

In accordance with the present invention, a silica dispersion is prepared by a two-step process, i.e., a first step of hydrolyzing and polycondensing an alkoxysilane in the presence of a base catalyst, and a second step of polycondensing the first polycondensation product in the presence of an acid catalyst.

In the first step, the alkoxysilane is hydrolyzed and polycondensed in the presence of a base catalyst. The basic hydrolysis and polycondensation process may be carried out by mixing the alkoxysilane with an organic solvent such as an alcohol(e.g., methanol, ethanol, propanol, butanol and the like), adding to the resulting mixture water in an amount sufficient to hydrolyze the alkoxysilane and a base catalyst in an amount needed to adjust the pH of the resulting solution to a range of 9 to 13 under an ambient condition, and keeping the resulting solution at a temperature ranging from 20 to 80° C. for a period ranging from 6 to 48 hours.

Representative examples of the alkoxysilane include tetraethoxy silane, tetramethoxy silane, tetraisopropoxy silane and the like.

Representative examples of a base which may be used as a catalyst in the present invention include sodium hydroxide, potassium hydroxide and ammonium hydroxide, wherein ammonium hydroxide is preferred since it does not remain in the film after drying and heat-treating step.

The dispersion obtained in the first step contains suspended colloidal silica particles, and most of these silica particles are of spherical form.

In the second step, the alkoxysilane solution containing partially colloidal silica particles developed is treated with an acid. This acid treatment may be carried out by adding to the colloidal silica dispersion obtained in the first step an acid in an amount needed to adjust the pH of the resulting solution to a range of 1 to 4, and keeping the resulting solution at a temperature ranging from 2 to 10° C. for a period ranging from 1 to 24 hours.

Representative examples of an acid which may be used as a catalyst in the present invention include hydrochloric acid, nitric acid, sulfuric acid and acetic acid, among which hydrochloric acid is preferred.

In the second step, remaining silica precursors present in the colloidal silica dispersion grow to form polysiloxane, a linear polymer, by the action of the added acid.

Thus, the silica dispersion prepared by the inventive process contains both spherical silica particles and linear polysiloxane polymers. This unique combination of two silica species act together to create a synergistic effect of enhancing surface roughness and durability in the step of forming a silica film.

(B) Preparation of a Silica Coating Composition

The silica dispersion obtained by the two-step process of the present invention is combined with an organic solvent, preferably a mixture of acetic acid and an alcohol to provide a silica coating composition for applying on the surface of a glass substrate.

Acetic acid incorporated in the coating composition functions to increase the wetting and leveling effect of the coating composition, i.e., it serves to prevent rapid volatilization of the alcohol component in the coating composition and to form an even coating of the composition on the substrate surface. Accordingly, the coating composition of the present invention produces a uniform and optically transparent silica film having less haze and rainbow defects, which has a suitable thickness for imparting good durability to a water-repellent glass plate.

Exemplary alcohols which may be used in the silica coating composition of the present invention include methanol, ethanol, propanol, butanol and the like, wherein ethanol is preferred.

When a mixture of acetic acid and ethanol is used in the preparation of the silica coating composition of the present invention, it is preferred to mix acetic acid and ethanol in a weight ratio of 1:9 to 9:1. When acetic acid is used in an amount of less than 10 % by weight, defects may occur on the coating layer produced due to rapid volatilization of ethanol. When acetic acid is employed in an amount of more than 90% by weight, the rate of ethanol volatilization becomes too low.

Further, the silica dispersion is diluted with a mixture of acetic acid and an alcohol in a weight ratio ranging from 1:9 to 9:1. When the amount of the silica dispersion is less than 10% by weight, the coating composition becomes excessively dilute, unsuitable for forming a film of a suitable thickness. When the silica dispersion is employed in an amount of more than 90% by weight, a poor coating is produced.

The step of combining the silica dispersion and the acid-alcohol mixture is preferably conducted after the preparation of the silica dispersion is completed. If an alcohol in an amount corresponding to that in the mixed solvent is employed in the production of the silica dispersion, a low yield of colloidal silica results due to lower concentrations of reactants, which leads to unsatisfactory formation of micro-pits in the silica film. Further, if acetic acid in an amount corresponding to that in the mixed solvent is employed in the second step of the silica dispersion preparation process, the growth of linear polysiloxane polymers becomes poor and thus the density of the coated layer is not sufficient to get a high durability.

(C) Formation of Silica Layer

The inventive silica coating composition thus obtained is applied to a glass substrate to provide a silica layer having micro-pits on the surface thereof.

The coating composition may be applied in a conventional manner such as dipping, spin, flow or spray coating and the like. The coating composition of the present invention is beneficial in that it can be conveniently spray-coated to a uniform thickness.

In accordance with the present invention, micro-pits on the surface of the coated silica layer are generated by the steps of: agglomerating an spherical silica particle present in the coating composition to form macro agglomerates; and cross-linking the spherical silica particles or agglomerates with the linear polysiloxane also present in the coating composition. The silica film thus formed has a high degree of compactness. A schematic view illustrating the formation of a rough surface in accordance with the present invention is shown in FIG. 1.

Figure 2:
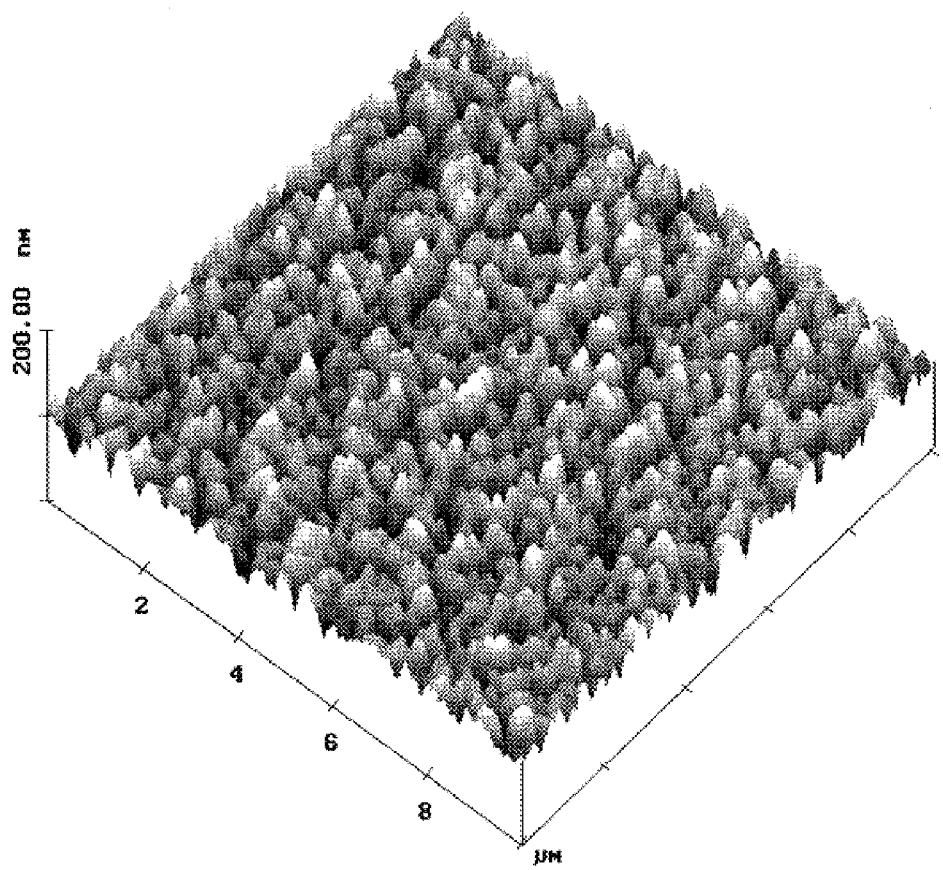
FIG. 2 is a AFM(Atomic Force Microscopy) photograph of a silica layer formed by applying a silica coating composition of the present invention, taken before heat treatment.

FIG. 2 is an AFM(Atomic Force Microscopy) photograph of a silica layer formed by applying the silica coating composition of the present invention to a glass substrate, taken before a heat treatment and it illustrates that the inventive silica coating composition is capable of providing micro-pits on the surface of the silica layer before the substrate is subjected to a heat treatment.

Figure 3:
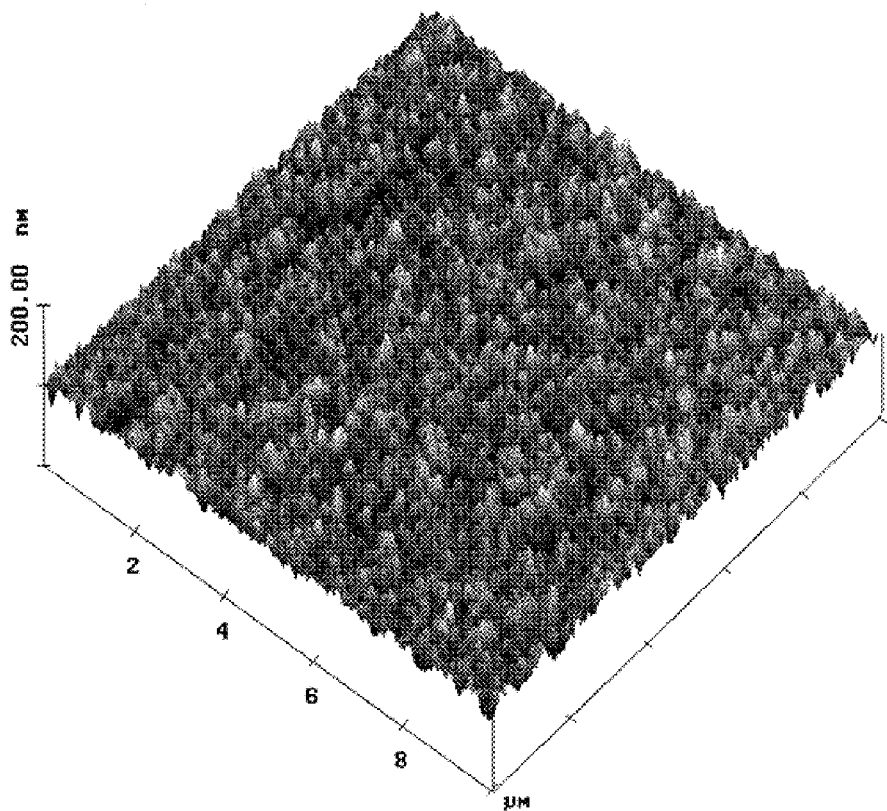
FIG. 3 is a AFM(Atomic Force Microscopy) photograph of a silica film formed by applying a silica coating composition obtained by hydrolyzing and polycondensing an alkoxysilane under only a basic condition.

In contrast, a silica dispersion prepared by hydrolysis and polycondensation of an alkoxysilane under only a basic condition provides a silica film having a low degree of compactness and hardness and the film thus obtained is easily peeled from the substrate. AFM (Atomic Force Microscopy) photograph of a silica film formed by applying a silica coating composition obtained under only a basic condition is shown in FIG. 3.

Figure 4:
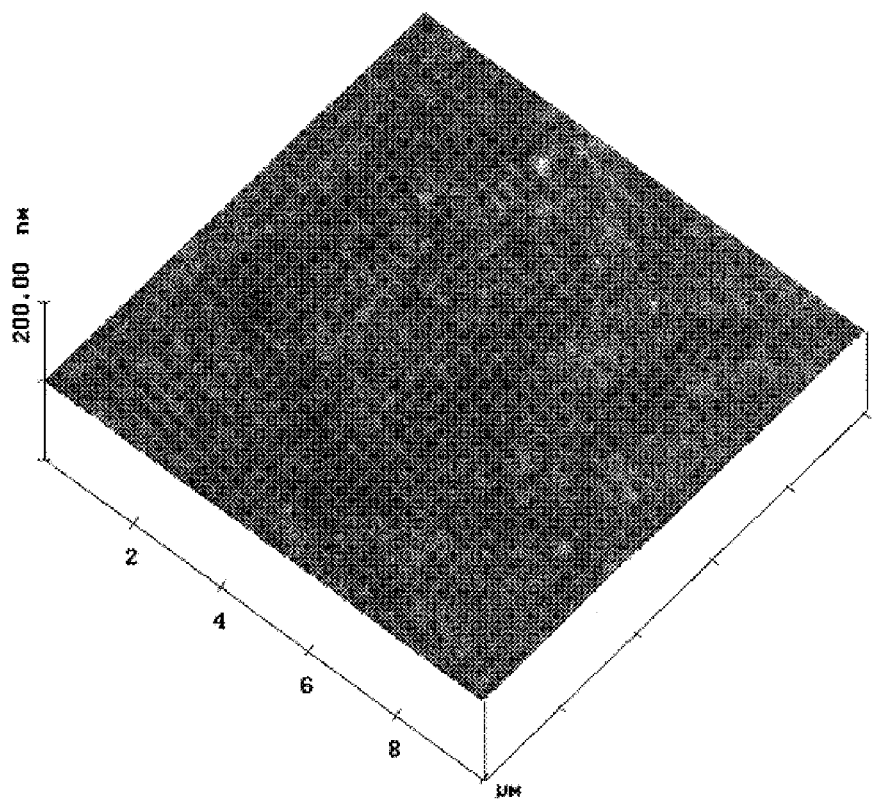
FIG. 4 is a AFM(Atomic Force Microscopy) photograph of a silica film formed by applying a silica coating composition obtained by hydrolyzing and polycondensing an alkoxysilane under only an acidic condition.

Further, when a silica coating composition obtained by hydrolysis and polycondensation of an alkoxysilane under only an acidic condition is used, a silica film having little surface roughness is formed, as can be seen in FIG. 4.

(D) Heat Treatment for the Formation of Silica Film

As described above, a silica layer coated on a glass substrate using the inventive silica coating composition has well-formed micro-pits before it is heat treated.

In order to increase the compactness and hardness of the silica layer, it is preferably heat treated at an appropriate temperature range so as not to deteriorate the functional properties of a substrate glass, e.g., a tempered or laminated glass. Specifically, the coated silica layer is dried at an ambient temperature for about 10 minutes and then heat treated at a temperature ranging from 100 to 300° C., preferably 100 to 120° C., for 10 to 60 minutes.

When the heat treatment temperature is below 100° C., the solvent remaining in the coating layer is not completely volatilized, thus generating a silica film having poor compactness and hardness. Further, in case a silica layer is formed on a tempered glass plate such as a door glass (side light) of an automobile, a high heat-treatment temperature of above 300° C. may deteriorate the safety feature of the glass plate. Particularly, in case a silica layer is applied on a safety glass having an inserted lamination film, e.g., a windshield glass of an automobile, the laminated plastic film may be damaged by a heat treatment at above 120° C.

(E) Properties of Silica Film

In accordance with the present invention, the thickness of a silica film deposited on a glass substrate preferably ranges from 400 to 900 Å. When the thickness is less than 400 Å, the durability of the film is poor, and when the thickness is greater than 900 Å, the film obtained is apt to have poor uniformity.

The surface roughness of the silica film obtained in accordance with the present invention may ranges from 25 to 100 Å as a centerline average surface roughness ("Ra"), measured with Atomic Force Microscopy (AFM).

"Ra" is a value generally representing the roughness degree of a rough surface having micro-pits, but it does not provide information on the peak-valley shape of micro-pits since it does not distinguish peaks and valleys. Micro-pits formed on the surface of a silica film increases the surface area of the film, thus enhancing the durability of water-repellent glass owing to a water-repellent agent retained in the valley parts thereof, and they induce high density of chemical bonds between silica and water-repellent layer. Accordingly, the durability is generally increases with the "Ra" value, but when "Ra" exceeds 100 Å, the compactness of the film begins to decrease.

(F) Formation of Water-repellent Film

In the present invention, a water-repellent film is applied on the surface of a silica film deposited on a glass substrate in accordance with the inventive process to prepare a water-repellent glass plate. The water-repellent film may be formed in a conventional manner by using a conventional water-repellent agent. Representative examples of the water-repellent agent may include a hydrolysis product of a fluoroalkylsilane compound represented by the following formula.

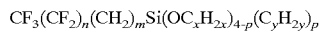

$CF_3(CF_2)_n(CH_2)_mSi(OC_xH_{2x})_{4-p}(C_yH_{2y})_p$ wherein, $0<n\leq13$, $0<m\leq4$, $0<x\leq4$, $0<p\leq4$.

The water-repellent agent may be applied to the silica film by a conventional method such as a spray, spin, dip, or flow coating. The coated water-repellent layer may be dried at a temperature ranging from 100 to 170° C. for about 30 minutes to provide a water-repellent glass of the present invention.

The present invention is not limited to the above mentioned embodiments, and modification and change may be made thereto by a person skilled in the art.

The following examples are only provided for the purposes of illustrating certain aspects of the present invention; they are not to be construed as limiting the scope of the present invention in any way.

EXAMPLE 1

Step (1) Preparation of a Silica Coating Composition

A mixture of 900 g of ethanol and 100 g of tetraethoxysilane was stirred for 30 minutes, and 5 g of an aqueous ammonia solution was slowly added to the mixture with stirring. The resulting mixture was kept stirring for an hour at room temperature and 32 g of distilled water was added thereto. The resulting mixture was stirred for 2 hours, sealed and kept in a 30° C. bath for 24 hours to obtain a colloidal silica dispersion.

The colloidal silica dispersion was cooled to room temperature, and added slowly to the dispersion in the open was 10 g of hydrochloric acid with stirring. After the smoke of ammonium chloride generated by the reaction subsided, the mixture was stirred for an hour, and then kept at 5° C. for an hour.

150 g of the colloidal silica dispersion thus obtained was combined with a mixture of 200 g of acetic acid and 650 g of ethanol to obtain a silica coating composition.

Step (2) Formation of Silica Film

A 30 cm×30 cm soda lime glass plate was cleaned, washed with distilled water several times and dried at room temperature. The surface of the glass plate was washed with isopropyl alcohol, and the coating composition prepared in Step (1) was spray-coated on the surface at a gun speed of 700 mm/sec under an air pressure of 0.5 kg/cm² to coat the glass plate with a silica film. The silica coated glass plate was then heat treated at 100° C. for 30 minutes.

EXAMPLE 2

The procedure of Example 1 was repeated except that the heat treatment of a silica coated glass plate was conducted at 300° C. instead of 100° C.

EXAMPLE 3

The procedure of Example 2 was repeated except that 500 g of the silica dispersion was combined with a mixture of 100 g of acetic acid and 400 g of ethanol and was used as a coating composition.

EXAMPLE 4

The procedure of Example 2 was repeated except that 400 g of the colloidal silica dispersion was combined with a mixture of 100 g of acetic acid and 500 g of ethanol and was used as a coating composition.

EXAMPLE 5

The procedure of Example 2 was repeated except that 100 g of the colloidal silica dispersion was combined with a mixture of 450 g of acetic acid and 450 g of ethanol and used as a coating composition.

COMPARATIVE EXAMPLE 1

The procedure of Example 2 was repeated except that 100 g of the colloidal silica dispersion was combined with 900 g of ethanol (no acetic acid) and used as a coating composition.

COMPARATIVE EXAMPLE 2

The procedure of Example 2 was repeated except that the colloidal silica dispersion was employed directly as a coating composition.

Test for Physical Properties of the Silica Film:

Each of the silica films prepared in Examples 1–5 and Comparative Examples 1–2 was analyzed for their physical properties as follows.

Haze and Rainbow phenomena: visual inspection for occurrence of haze and rainbow phenomena.

Transparency: analyses with a UV spectroscopy.
Thickness and refractive index: analyses with an ellipsometer (SD 2100 marketed by Plasmos of Germany).
Ra(a centerline average surface roughness): analysis with an atomic force microscopy(ATM) (DI 3000 marketed by Digital Instrument).

The test results are shown in Table 1.

TABLE 1

|  | Haze | Rainbow | Transparency (%) | Thickness (Å) | Refractive index | Ra (Å) |
|---|---|---|---|---|---|---|
| Ex. 1 | No | No | 93 | 646 | 1.4403 | 50 |
| Ex. 2 | No | No | 92 | 810 | 1.4307 | 46 |
| Ex. 3 | No | No | 92 | 870 | 1.4288 | 72 |
| Ex. 4 | No | No | 91 | 740 | 1.4379 | 64 |
| Ex. 5 | No | No | 92 | 720 | 1.4302 | 28 |
| Com. Ex. 1 | No | Observed | 87 | 120 | 1.3824 | 65 |

As can be seen from Table 1, the inventive process provides a silica film coated on a glass substrate, said silica film having a superior uniformity and transparency over those formed by conventional process. When a low-temperature heat treatment is employed in the inventive process, these characteristic desirable features of the present invention are brought about by way of exploiting a silica coating composition containing both spherical colloidal silica particles and linear polysiloxane.

While the invention has been described with respect to the specific embodiments, it should be recognized that various modifications and changes may be made by those skilled in the art to the invention which also fall within the scope of the invention as defined by the appended claims.

What is claimed is:

1. A process for the preparation of a water-repellent glass which comprises:
   (a) preparing a colloidal silica suspension by hydrolyzing and polycondensing an alkoxysilane in an organic solvent under a basic condition in the presence of water, and then treating the colloidal silica suspension under an acidic condition, to obtain a silica dispersion containing cross-linked spherical silica particles and linear polysiloxane,
   (b) combining the silica dispersion with a mixed solvent composed of acetic acid and an alcohol to obtain a coating composition,
   (c) applying the coating composition on the surface of a glass substrate to form a silica layer therefrom,
   (d) heat treating the silica layer to provide a silica film on the glass substrate, and
   (e) applying a water-repellent agent on the silica film to provide the water-repellent glass plate.

2. The process of claim 1 wherein the alcohol is selected from the group consisting of methanol, ethanol, propanol, butanol and a mixture thereof.

3. The process of claim 1 wherein acetic acid and an alcohol are mixed in a weight ratio of 1:9 to 9:1.

4. The process of claim 1 wherein the mixed solvent is mixed with the silica dispersion obtained in Step(a) in a weight ratio of 1:9 to 9:1.

5. The process of claim 1 wherein the basic condition lies in a pH range of 9 to 13, and the acidic condition in a pH range of 1 to 4.

6. The process of claim 1 wherein the silica coating composition is applied on the substrate surface by a spray coating method.

7. The process of claim 1 wherein the silica layer is heat treated at a temperature ranging from 100 to 300° C.

8. The process of claim 7 wherein the silica layer is heat treated at a temperature ranging from 100° to 120° C.

9. A water-repellent glass comprising a glass substrate, a silica film and water-repellent film in order, prepared by a process according to any one of claims 1 to 8.

10. The water-repellent glass of claim 9 wherein the silica film has a thickness ranging from 400 to 900 Å.

* * * * *